No. 716,388. Patented Dec. 23, 1902.
C. CROMPTON.
STEERING MECHANISM FOR MOTOR VEHICLES.
(Application filed Jan. 29, 1902.)
(No Model.)
3 Sheets—Sheet 2.
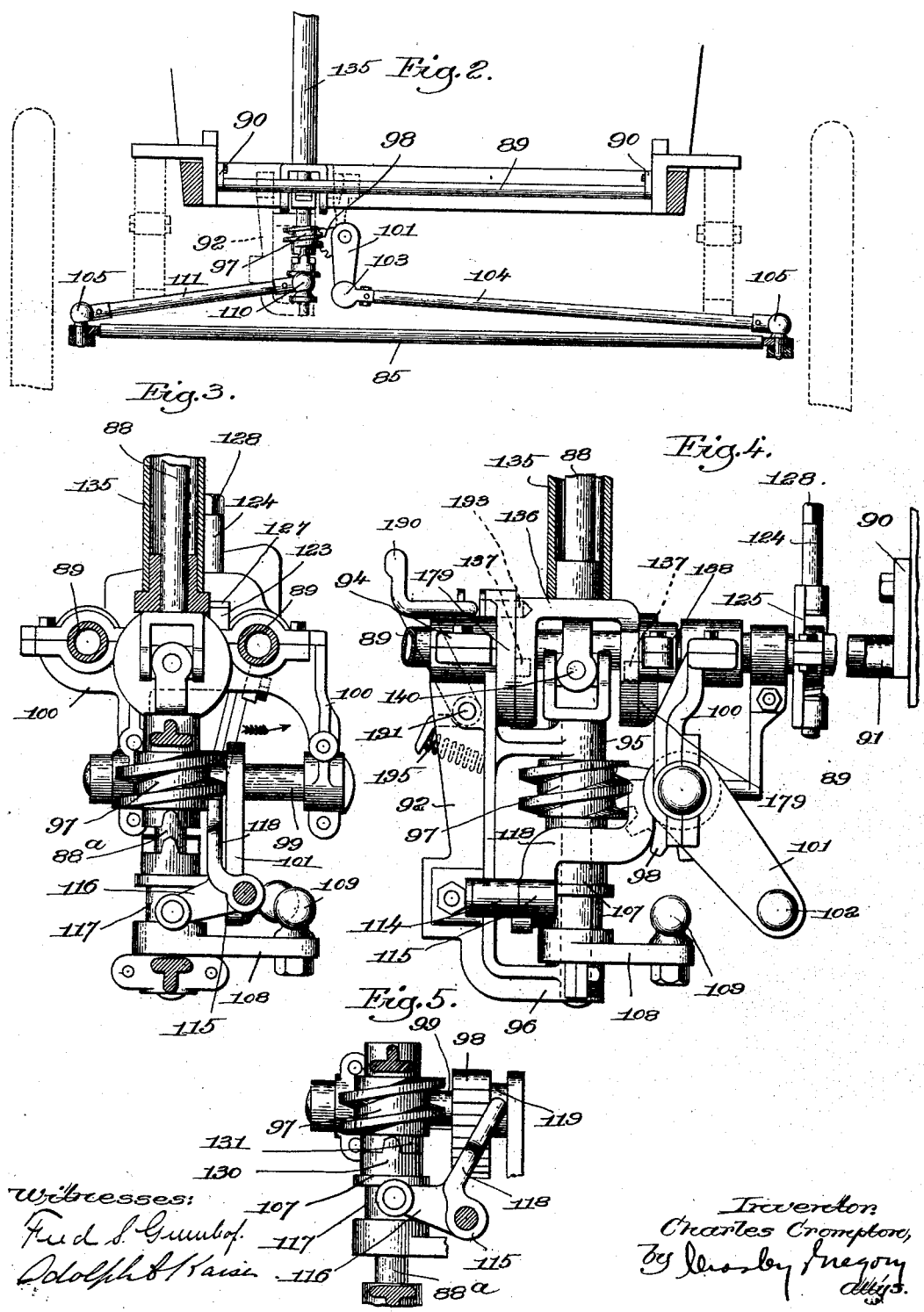

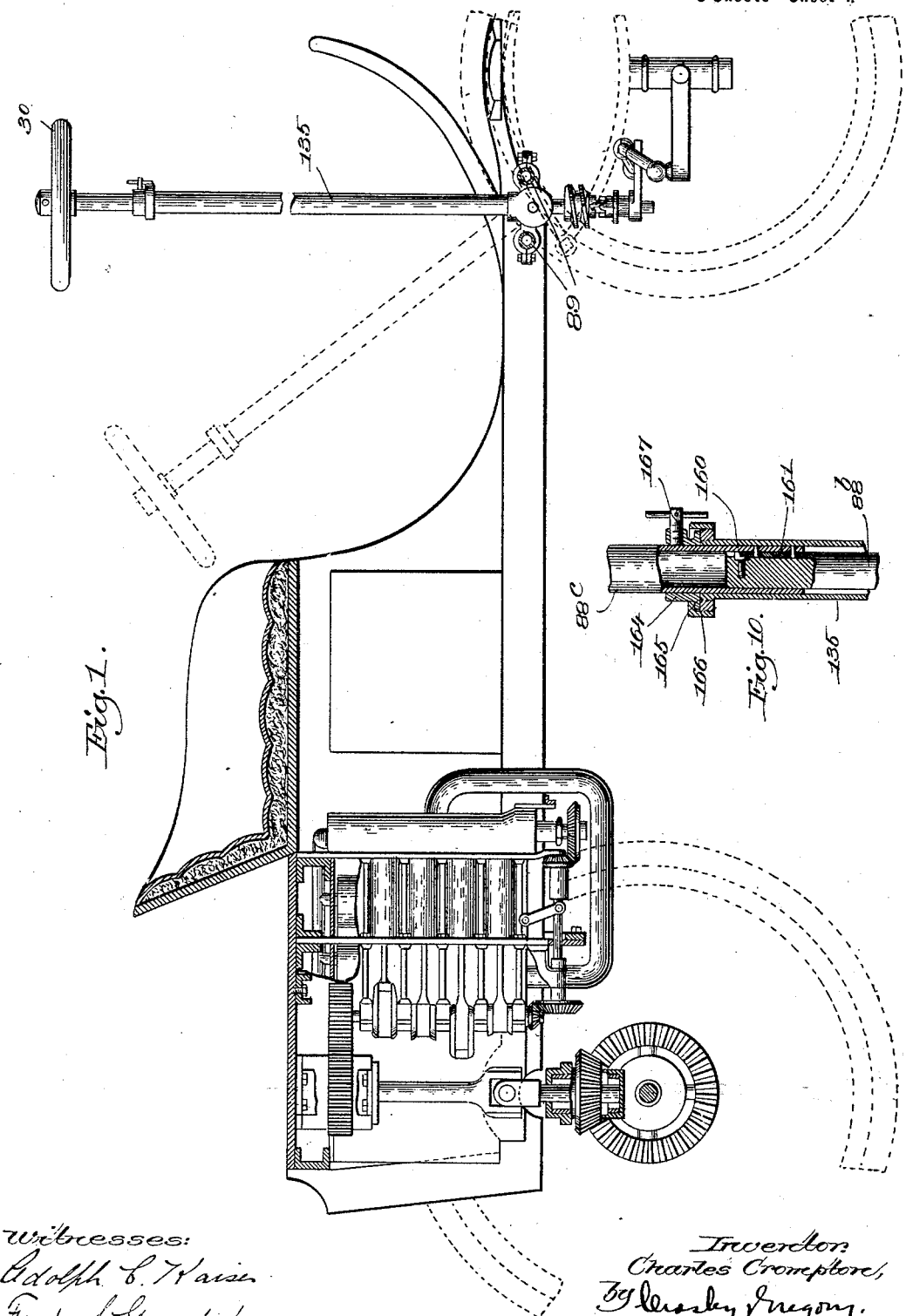

No. 716,388. Patented Dec. 23, 1902.
C. CROMPTON.
STEERING MECHANISM FOR MOTOR VEHICLES.
(Application filed Jan. 29, 1902.)
(No Model.) 3 Sheets—Sheet 3.
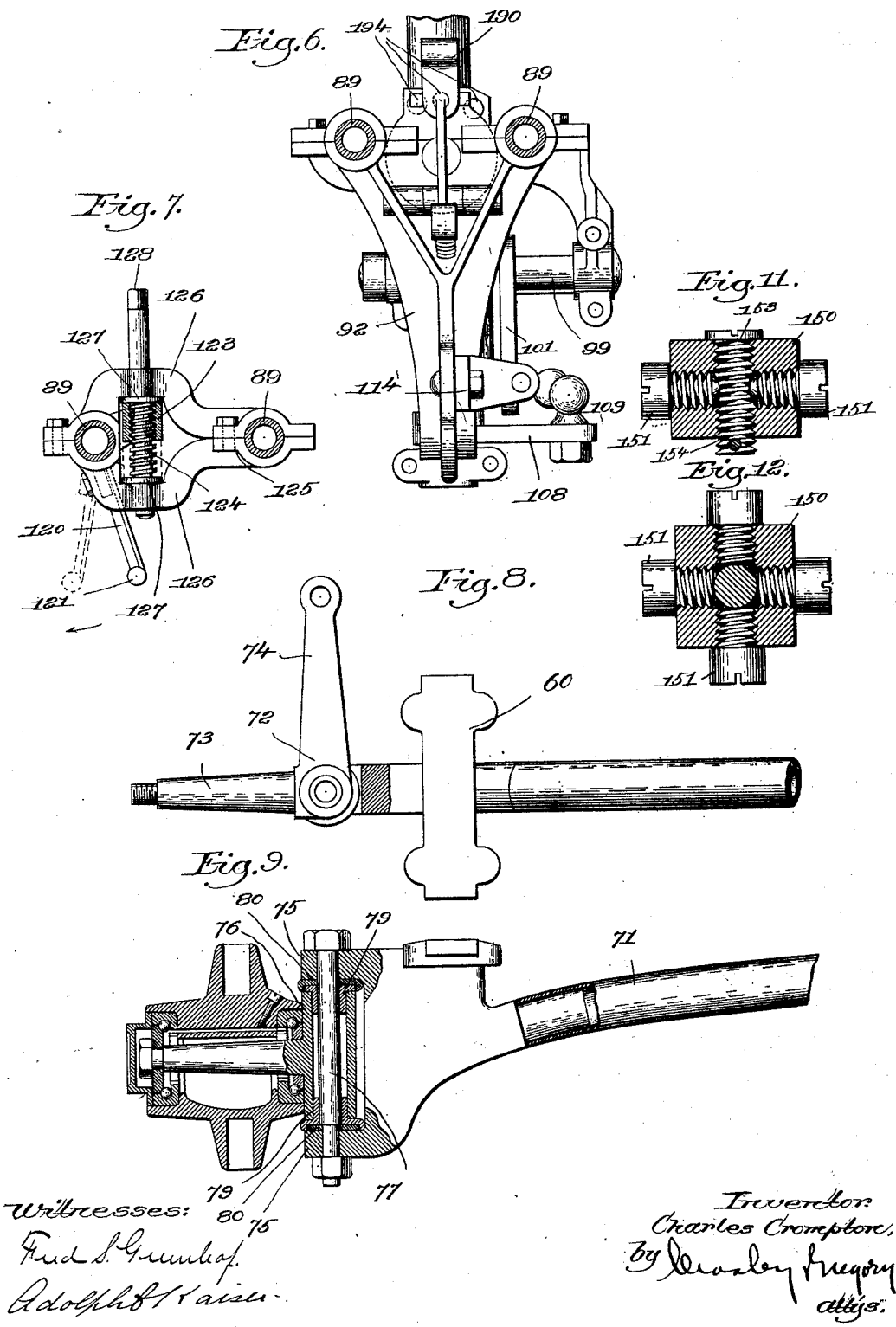

UNITED STATES PATENT OFFICE.

CHARLES CROMPTON, OF WORCESTER, MASSACHUSETTS.

STEERING MECHANISM FOR MOTOR-VEHICLES.

SPECIFICATION forming part of Letters Patent No. 716,388, dated December 23, 1902.

Original application filed September 25, 1901, Serial No. 76,543. Divided and this application filed January 29, 1902. Serial No. 91,659. (No model.)

*To all whom it may concern:*

Be it known that I, CHARLES CROMPTON, a citizen of the United States, residing at Worcester, in the county of Worcester and State of Massachusetts, have invented an Improvement in Steering Mechanism for Motor-Vehicles, of which the following description, in connection with the accompanying drawings, is a specification, like numerals on the drawings representing like parts.

This invention relates to mechanism for steering a motor-vehicle or equivalent device, and has for its object to provide a novel form of steering mechanism which is adapted for different conditions of road.

One familiar way in which motor-vehicles are controlled as to their direction of movement or are steered is to connect the steering-wheels directly to a steering shaft or head, which is so positioned as to be readily operated by the driver of the vehicle. Another way in which the steering mechanism of the motor-vehicle is sometimes constructed is to indirectly connect the steering-wheels to the steering shaft or head through a system of gearing. In the first type of steering mechanism the construction is such that a movement of the steering-head through a slight angle gives to the steering-wheels a movement through an approximately corresponding angle, while in the second type above referred to the construction is such that in order to turn the steering-wheels to any considerable angle the steering shaft or head must be revolved one or more times.

The first type of steering mechanism above referred to has the advantage that the steering-wheels can be quickly moved into the desired position; but it has the disadvantage that where the road is uneven or rough any obstructions, even though slight, with which one or the other of the wheels comes in contact produces a jar which is felt by the driver of the machine. Furthermore, should one of the wheels strike an obstruction while the vehicle is moving the tendency would be to turn the wheels, and since the connection between the wheels and steering-shaft is direct the resistance to this turning movement must come entirely from the operator. In steering mechanisms of the second class the movement of the steering-wheels from one position to another must necessarily be rather slow, because of the necessity of giving to the steering-shaft one or more complete rotations in order to affect the steering-wheels; but with this construction any tendency of the steering-wheels to turn from their correct direction caused by the unevenness of the road or obstacles over which the said wheels may run is resisted by the gearing between the wheels and the steering-head, and as a consequence the driver feels comparatively little shock or jar.

It is the object of the present invention to combine in a single structure both types of the above-described steering mechanism and the construction is such that the steering mechanism can be converted into a "direct-acting" mechanism, as I have chosen to call the steering mechanism of that type wherein the steering shaft or head is connected directly to the steering-wheels, or an "indirect" mechanism, as I have chosen to term the second class of steering devices, wherein the head is connected to the steering-wheels indirectly through the gearing. With my improved steering mechanism, therefore, whenever the vehicle is being driven over smooth roads or in a crowded street, where constant and quick turning of the steering-wheels is necessary to guide the vehicle around obstructions, I will so adjust my steering mechanism that the steering-shaft will be directly connected to the steering-wheels, so that the effect will be a direct-acting steering mechanism. When, on the other hand, the vehicle is being driven over rough roads, but where comparatively little quick action of the steering mechanism is necessary, I will so adjust the steering mechanism that the wheels will be turned indirectly from the head through a system of gearing. The system of gearing that I employ is such that it serves to lock the wheels against being turned by meeting obstacles in the road.

My improved steering mechanism is mounted or carried directly by the body of the vehicle, which is of course yieldingly mounted upon springs, and the said mechanism is connected to the steering-wheels by a flexible connection, which is not affected by the yielding movement of the vehicle-body. To thus support the steering mechanism, I preferably provide a plurality of rods or bars, which extend across the vehicle-body and are secured at their ends to the sills thereof, and on the said cross-bars are supported suitable brackets, which sustain the operative parts of the steering mechanism. The steering-shaft, to the upper end of which the usual hand-wheel is fastened, has a universal joint therein, so that the upper end thereof may be adjusted into any position convenient for the driver.

In the drawings, Figure 1 is a central longitudinal section of my improved carriage. Fig. 2 is a view showing in front elevation the direct and indirect connection between the steering-shaft and the steering-wheels. Figs. 3, 4, 5, 6, and 7 are details of the steering mechanism. Figs. 8 and 9 are views showing the manner of pivoting the steering-wheels to the axle. Fig. 10 is another detail of the steering-shaft, and Figs. 11 and 12 are details hereinafter referred to.

The body of the motor-vehicle and the driving mechanism may be of any suitable or approved pattern, and for convenience I have in Fig. 1 illustrated a construction similar to that shown in my copending application, Serial No. 76,548, filed September 25, 1901, of which this application is a division. I would say, however, that any other form of body or driving mechanism may be employed, if desired. The steering-wheels may be attached to either the front or the rear axle, as desired, although I have in this embodiment of my invention disclosed the same as attached to the front axle. Preferably the front wheels are mounted upon spindles, which are in turn pivoted to the end of the front axle in some suitable way to turn about a vertical pivot, and the front axle will form part of the frame of the vehicle, this being one common way of mounting the steering-wheels of a motor-vehicle.

Referring briefly to Figs. 8 and 9 of the drawings, 71 designates the front axle, which may be of any suitable or usual construction and which is shown as having the flat bearing 60, to which the vehicle-springs are secured. The steering-wheels are carried by spindles 73, forming one arm of a bell-crank 72, the other arm 74 of the bell-crank being connected to the steering mechanism, as I shall presently describe. The bell-cranks 72, while they may be pivoted to the axles in any suitable way, are shown in Fig. 9 as including a hub 76, which is supported between arms 75 on the end of the axle and through which arms and hub a pivot-bolt 77 passes. The hub is also illustrated as being provided with bushings 79, the flanged ends of which engage wearing-washers 80, and I preferably make the upper wearing-washer 80 with a downturned flange, which embraces the flanged portion of the upper bushing 79, as seen in Fig. 9, while the lower bushing will be provided with a similar flange to embrace the lower washer 80. This construction is preferable, as it keeps the bearing clean and free from dust. The arms 74 of the bell-cranks 72 are connected together by a tie member 85, as seen in Fig. 2, so that the said steering-wheels will move in synchronism. The steering-shaft is designated by 88, and it may have at the upper end thereof a hand-wheel 30 or similar device, by which the said shaft may be turned, and, as I have stated, the said shaft and the mechanism connected thereto are supported entirely by the vehicle-body, so as to partake of the yielding movement thereof. For this purpose I have shown extending across the body of the vehicle and beneath the floor thereof two rods or supports 89, which are secured at their ends to the sills of the body in any suitable way, preferably by means of brackets 90, which are bolted to the said sills and have projecting therefrom lugs 91, which enter recesses in the ends of the rods or supports 89. I have illustrated two such rods or supports, and secured thereupon is a bracket 92 of any suitable shape or construction, which bracket is adapted to support the lower end of the steering-shaft 88, which preferably comprises the sections $88^a$, $88^b$, and $88^c$, as hereinafter described.

Referring now to Figs. 3, 4, and 6, it will be seen that the bracket 92 is provided at its upper end with two half-round seats, which fit the under side of the rod 89, the said bracket being held in place by means of cap-pieces 94, which clamp said bracket to the rods, as will be obvious. The bracket has extended laterally therefrom two arms 95 96, respectively, in the ends of which are alined bearings for the lower end of the steering-shaft 88, such lower end of the shaft being designated by $88^a$. The said lower end $88^a$ of the shaft has connected thereto a worm which is adapted to mesh under certain conditions with a segmental worm-gear, and the said worm-gear is in turn connected to the steering-wheels, whereby when the worm on the steering-shaft and the worm-gear are in mesh the turning of the steering-wheels is accomplished through this worm-gear, and of course when this construction is employed it will take one or more rotations of the steering-shaft to turn the steering-wheels through any appreciable angle. Loose upon the lower end of the steering-shaft is a hub or sleeve which is connected directly to the steering-wheels, and the worm-gear and the said hub are so connected together that when the worm-gear is out of mesh with the worm on the shaft the hub or sleeve is locked to the shaft, and when the worm-gear is thrown into mesh with the worm on the shaft the hub or sleeve is disconnected from the shaft. The result of this construction, therefore, is that when the parts are so adjusted that the worm-gear is thrown out of mesh with the worm on the shaft and the sleeve is locked to the shaft any movement of the steering-shaft is communicated directly through the sleeve to the steering-wheels, and the steering-wheels will move through approximately the same angle that the steering-shaft does. When adjusted in this manner, the device is a direct-steering device. On the other hand, when the worm-gear is thrown into mesh with the worm on the steering-shaft and the sleeve or hub is disconnected from the said shaft then the rotation of the shaft is communicated to the steering-wheels indirectly through the worm-gearing, and because of the well-known characteristics of worm-gearing it will take several revolutions of the steering-shaft to effect the turning of the steering-wheels. When in the latter adjusted position, however, any tendency to turn the wheels from their true course caused by meeting obstacles or otherwise, is resisted by the worm-gear rather than by the operator himself, the worm-gear serving to lock the wheels in their adjusted position. The worm upon the shaft is designated by 97, and the worm-gear which is adapted to be brought into mesh with the said worm or disconected therefrom is designated by 98. One convenient way of mounting the said worm-gear so as to be capable of being brought into mesh with or disconnected from the worm is by slidably mounting the same upon a shaft 99, which shaft is supported in suitable brackets 100, also carried by the cross-rods 89. The worm-gear 98 has connected thereto and rigid therewith an arm 101, from the end of which projects an offset 102, (shown in the drawings as spherical in shape and which fits a suitable spherical socket 103 in the end of a link 104,) the other end of said link being in turn connected in some suitable way, as by a ball-and-socket joint 105, with the arm 74 of the bell-crank of one of the steering-wheels. The hub or sleeve, which is loose upon the lower end 88ᵃ of the steering-shaft, is designated by 107, and it has extended therefrom an arm 108, likewise provided with a spherical knob or portion 109, which is adapted to engage a spherical socket 110 in a link 111, which link in turn is connected by a ball-and-socket joint 105 with the other bell-crank 72.

I have provided suitable mechanism whereby either the gear 98 may be brought into operative relation with the steering-shaft 88 or the hub 107 may be clutched to the said shaft, and it will be seen on referring to Fig. 2 that when the gear 98 is in operative relation with the worm 97 on the steering-shaft the rotation of the steering-shaft by means of the hand-wheel will operate to turn the shaft 99 and swing the arm 101, thereby through the link 104 turning the steering-wheels; but by reason of the worm-and-gear connection between the steering-shaft and the arm 101 it will be necessary to turn the steering-shaft several times in order to effect the position of the steering-wheels. The worm-and-gear connection, however, locks the steering mechanism in any adjusted position, so that even though the road is very uneven or one of the steering-wheels strikes an obstruction they cannot be turned, because the worm-and-gear connection locks them against turning. It will also be seen that when the worm-gear 98 is disconnected from the worm 97 and the hub 107 is clutched to the shaft a very slight turning movement of the shaft will operate to turn the steering-wheels sufficiently to steer the vehicle. When, however, the steering-shaft is connected directly to the steering-wheels through the link 111, it is necessary to hold the hand-wheel 30 firmly in order to prevent the steering-wheels from being turned out of their proper direction by obstructions in the roadway. The connection between the worm-gear 98 and the hub 107 is such that when one is brought into operative relation with the steering-shaft the other is thrown out of operative relation therewith, and vice versa. This object is conveniently secured by the following structure. The bracket 92 is provided with an offset 114, having a bearing in which is mounted the bell-crank lever 115, one arm 116 of said lever having a projection engaging a groove 117 in the hub 107, while the other arm 118 of said lever is bent, as shown in Fig. 4, and its end has a projection engaging a groove 119 in the hub of the segmental worm-gear 98, which, as stated above, is slidably mounted on the shaft 99. An operating bell-crank 120 is mounted for turning movement upon one of the rods 89 (see Fig. 7) and has one arm thereof provided with the projection 121, engaging the groove 119 in the hub of the segmental worm-gear 98. The other arm of the bell-crank 120 has a pivotal connection with a nut 123, working on an operating-screw 124, the said screw being mounted for rotation in a two-part bracket 125, which is clamped about the rods 89. The said bracket 125 has the offset portions 126, provided with suitable apertures to receive the operating-screw 124, and the said screw is provided with the collars 127, engaging the offset portions and operating to hold the screw against longitudinal movement. The upper end of the screw is squared, as at 128, whereby a wrench or other tool may be applied thereto.

Figs. 3 and 4 show the position of the parts when the steering mechanism is geared for indirect action—that is, when the steering is done through the worm-gears—and Fig. 5 shows the position of the parts when the steering is done directly through the link 111. When it is desired to change the steering mechanism from indirect to direct, the screw 124 is operated to turn the nut 123 down, and thus swing the bell-crank 120 in the direction of the arrow, Figs. 7 and 3, and into the dotted-line position, Fig. 7. This movement of the bell-crank 120 through the projection 121 operates to slide the segmental worm-gear 98 longitudinally on its shaft 99 into the position shown in Fig. 5, disconnecting the same from or throwing the same out of operative relation with the worm 97. This movement of the gear 98 operates, through the bell-crank 115, to raise the hub 107, carrying the arm 108, and since the hub has integral therewith a clutch member 130 and the shaft-section 88ª is provided with a coöperating clutch member 131, said last-named clutch member preferably being integral with the worm 97, it will be seen that the raising of the hub 107 to the position shown in Fig. 5 clutches the same to the shaft-section 88ª. When the steering-shaft is turned with the parts in this position, the steering will be done directly through the link 111.

From the above description it will be seen that my steering mechanism is so constructed that by properly adjusting the same the steering-shaft may be connected either directly to the steering-wheels or indirectly thereto, as desired, and as I believe I am the first to accomplish this I desire to claim the same, broadly, without reference to the particular mechanism for accomplishing the object. It will also be seen that the steering-head or the steering mechanism is mounted upon and supported entirely by the yieldingly-supported vehicle-body, and therefore partakes of its movements, and that the link connections 104 and 111 provide a flexible connection between said steering-head and the steering-wheels, which compensates for the relative movement between the body and running-gear. This I consider as being quite an important feature of my invention, for when the steering mechanism is mounted upon and supported entirely by the running-gear, as is customary, all the jar and vibration of the running-gear is transmitted to the steering mechanism and is felt by the operator or driver, while with my improved construction, wherein the steering device is mounted upon the yieldingly-supported body, the greater portion of the jar and vibration is absorbed by the springs of the vehicle and is not transmitted to the steering mechanism.

I preferably provide my steering-shaft with a universal joint, which connects the two sections 88ª and 88ᵇ thereof, so that said shaft may be thrown into the vertical position shown in full lines, Fig. 1, when people are getting into or out of the vehicle; but when it is desired to operate the vehicle the said shaft may be pulled over toward the driver into the dotted-line position, Fig. 1, thus bringing the hand-wheel within convenient reach of the operator and in such a plane as to be easily grasped by the hands.

The section 88ᵇ of the steering-shaft 88 projects through a suitable tubular support 135, and the tubular support is provided with a head 136, which is pivoted upon suitable seats or bearings (shown in dotted lines at 137) and carried by flanges 179 on the brackets 92 and 138, respectively, whereby the said support may swing toward and from the seat of the vehicle. The shaft 88, which turns in the support 135, has the universal joint 140 in line with the pivotal axis of the head 136. The form of universal joint I preferably employ is shown in Figs. 11 and 12, and it comprises the swivel-block 150, having projecting from the sides thereof the four pivot-screws 151, upon which the forked heads of the shaft-sections 88ª and 88ᵇ are pivoted. Each of said screws is concaved at its inner end, and to lock the said screws from becoming loosened I preferably pass vertically through the said swivel-block, as seen in Fig. 11, a locking-screw 153, said screw fitting the curved inner ends of the screw 151, and thus locking them from rotation. To hold the said locking-screw in position, I may, if desired, provide a cotter-pin 154 at its lower end.

The steering-shaft is preferably made telescopic, so that the hand-wheel 30 may be moved closer to or farther from the driver, and on referring to Fig. 10 the section 88ᵇ of the shaft telescopes into the upper tubular section 88ᶜ thereof, the said sections being locked together by any suitable means, as by means of a key 161, riveted to the lower end of the tubular section 88ᶜ and playing in a groove in the section 88ᵇ. A pin 160, screwed in section 88ᵇ in alinement with the groove, serves as a stop to prevent the upper section from being drawn off from the lower section. To lock the telescopic sections of the shafts in their adjusted position, I clamp to the tubular section 88ᶜ a ring 164, having a suitable flange 165, which is swiveled in a head 166, fast to the tubular support 135. By loosening the said screw 167, which clamps the ring 164 to the shaft-section 88ᶜ, the length of the steering-shaft may be adjusted, after which by setting up the said screw 167 the section 88ᶜ will be locked against longitudinal movement. Owing to the swivel connection between the ring 164 and the head 166, however, the said shaft may have a free turning movement.

190 indicates a latch which coöperates with the head 136 to lock the swinging support 135 in any angular position desired. This latch is pivoted, as at 191, upon the bracket 92 and is provided with a locking projection 193, which plays through the flange 179 and engages any one of a series of sockets 194 in the head 136, the said latch being held in operative position by a spring 195. The latch 190 projects up through the floor of the vehicle-body and is intended to be disengaged from the head 136 by the foot of the person in charge of the vehicle. It will thus be seen that the swinging support 135 may be locked in any angular position desired.

While I have herein described the best means now known to me for accomplishing the object of my invention, yet I do not desire to be limited to the exact construction shown, as the details thereof may be varied in many ways without departing from the spirit of my invention, which consists in providing a steering mechanism with means for connecting the steering-shaft either directly to the steering-wheels or indirectly to the same, as desired, and also in mounting the steering mechanism upon the yieldingly-mounted body of the vehicle and providing flexible connections between the same and the steering-wheels.

Having described my invention, what I claim, and desire to secure by Letters Patent, is—

1. In a motor-vehicle, a steering-shaft, steering-wheels, a connection extending directly from said shaft to the steering-wheels, a second connection between the shaft and steering-wheels, said second connection including gearing, and means to render either of said connections operative.

2. In a motor-vehicle, a steering-shaft, an arm loose thereon and connected to the steering-wheels, a worm fast on said shaft, a gear operating with said worm and also connected to said steering-wheels, and means to put either said arm or the gear into operative relation with said shaft, whereby the steering may either be done directly from the shaft or indirectly through the gears.

3. In a motor-vehicle, an axle, connected steering-wheels pivoted thereto, a steering-shaft, an arm loose thereon, a link connecting said arm and steering-wheels, a second link connected to the steering-wheels, gears between the same and the steering-shaft, and means to put either the gears or the arm into operative relation with the steering-shaft whereby said steering-wheels may be turned directly from the shaft or indirectly through the gears.

4. In a motor-vehicle, steering-wheels, a steering-shaft, an arm loose thereon, a second arm, gearing between said second arm and the shaft, connections between each arm and the steering-wheels, and means to put either said loose arm or said gears in inoperative relation with said steering-shaft.

5. In a motor-vehicle, steering-wheels, a steering-shaft, a worm fast thereon, a slidably-mounted worm-gear adapted to mesh therewith, connections between said worm-gear and the steering-wheels, an arm loose on said steering-shaft and connected to the steering-wheels, and means to put either the arm or the worm-gear into operative relation with the steering-shaft.

6. In a motor-vehicle, steering-wheels, a steering-shaft, a worm fast thereon, a slidably-mounted worm-gear adapted to mesh therewith, and having an arm, an arm loose on said steering-shaft, links between each of said arms and the steering-wheels, and connections between said worm-gear and loose arm, whereby when one is in operative relation to the steering-shaft the other is in inoperative relation therewith.

7. In a motor-vehicle, a pair of steering-wheels, a steering-shaft, a sleeve loose thereon and having an arm projecting therefrom, said sleeve having a clutch member coöperating with a clutch member on the shaft, connections between said arm and the steering-wheels, a worm fast on said steering-shaft, a slidably-mounted worm-gear adapted to mesh with said worm, connections between said gear and the steering-wheels, and means connecting said sleeve and worm-gear whereby when the sleeve is clutched to the shaft the gear is out of mesh with the worm.

8. In a motor-vehicle, a pair of steering-wheels, a steering-shaft, a sleeve loose thereon and including a clutch member, a coöperating clutch member on the shaft, a worm fast to the shaft, a slidably-mounted worm-gear adapted to mesh with said worm, means to connect said sleeve to the steering-wheels, independent connections between said worm and steering-wheels, means to put said gear into or out of mesh with the worm, and connections between said gear and sleeve, whereby when the gear is out of mesh with the worm the sleeve is clutched to the shaft.

9. In a motor-vehicle, steering-wheels, a yieldingly-supported body, steering mechanism carried by said body, said mechanism including a steering-shaft extending through the floor of the vehicle and flexible connections between said shaft and the steering-wheels, said shaft having a universal joint therein substantially at the floor-line of the body, whereby the said shaft may be moved toward and from the seat without operating the steering-wheels.

10. In a motor-vehicle, steering-wheels, a yieldingly-supported body, steering mechanism carried thereby, said mechanism including a support pivoted to swing toward and from the seat of the vehicle, a steering-shaft journaled in said support, said shaft having a universal joint situated in the line of the pivot of the support, and flexible connections between said shaft and the steering-wheels of the vehicle.

11. In a motor-vehicle, a yieldingly-mounted body, a steering-shaft comprising two sections connected by a universal joint, bearings rigidly carried by the vehicle-body in which the lower section of the shaft is journaled, connections between said latter shaft-section and the steering-wheels, and a support pivoted to the body and having bearings in which the upper section of the shaft is journaled.

12. In a motor-vehicle, a yieldingly-mounted body, a steering-shaft comprising two sections connected by a universal joint, bearings rigidly carried by the body and in which the lower section of the shaft is journaled, flexible connections between the said lower shaft-section and the steering-wheels, and a support pivoted to the vehicle-body and having bearings in which the upper section of the steering-shaft is journaled, said upper section of the shaft being extensible.

13. In a motor-vehicle, a vehicle-body, supporting members extending transversely thereof, brackets on said supporting members, a stationary shaft comprising two sections connected by a universal joint, the lower section being journaled in bearings in said brackets, and a support pivoted to said brackets and in which the upper section of the shaft is journaled.

14. In a motor-vehicle, steering mechanism including a tubular support pivoted to swing toward and from the seat of the vehicle, a flexible and extensible steering-shaft in said support, a hand-wheel at the upper end of said shaft, and means to connect said shaft to the steering-wheels of the vehicle.

15. In a motor-vehicle, running-gear including steering-wheels, a body supported on said running-gear, and steering mechanism carried by the body, said mechanism including a steering-shaft extending through the floor of the vehicle, and a plurality of independently-operative connections between said shaft and the steering-wheels, said shaft having a universal joint therein substantially at the floor-line of the body whereby the shaft may be moved toward and from the seat without affecting the position of the steering-wheels.

16. In a motor-vehicle, running-gear including connected steering-wheels, a body yieldingly mounted on said running-gear, a steering-shaft supported entirely by said body, said shaft having an arm, and a link connecting said arm to the spindle of one of the steering-wheels, said link having a universal-joint connection with the said arm.

17. In a motor-vehicle, a steering-head, and a plurality of independently-operative connections between said head and steering-wheels.

18. In a motor-vehicle, a steering-shaft, a plurality of independent connections between said shaft and the steering-wheels, and means for rendering either of said connections operative.

19. In a motor-vehicle, a steering-shaft, two independent connections between said shaft and steering-wheels, and means whereby when one connection is operative the other connection is rendered inoperative.

20. In a motor-vehicle, a steering-shaft, a plurality of independent connections between said shaft and the steering-wheel, said connections constructed to transmit the turning movement of the shaft about its axis to the steering-wheels, and means to render either of said connections operative.

21. In a motor-vehicle, a shaft, two independent connections between the shaft and the steering-wheels, both of said connections adapted to transmit the turning movement of the shaft to the steering-wheels, and means to render either of said connections operative, the construction being such that one of said connections gives to the steering-wheels a greater angular movement than the other for a given angular movement of the shaft.

In testimony whereof I have signed my name to this specification in the presence of two subscribing witnesses.

CHARLES CROMPTON.

Witnesses:
HENRY W. KING,
M. L. POTTER.